United States Patent [19]
Berghöfer

[11] 3,861,721
[45] Jan. 21, 1975

[54] PIPE EXPANSION JOINT
[76] Inventor: Hans Berghöfer, Alte Landstrasse 274, Hamburg, Germany
[22] Filed: May 23, 1973
[21] Appl. No.: 363,047

[30] Foreign Application Priority Data
May 24, 1972 Germany.............................. 222515

[52] U.S. Cl. .............................................. 285/236
[51] Int. Cl. ............................................ F16l 21/00
[58] Field of Search ............................. 285/236, 242

[56] References Cited
UNITED STATES PATENTS
3,211,475  10/1965  Freed et al.......................... 285/236
3,516,694  6/1970  Schwartz............................. 285/236
FOREIGN PATENTS OR APPLICATIONS
317,669  5/1934  Italy.................................... 285/236

*Primary Examiner*—Patrick D. Lawson
*Attorney, Agent, or Firm*—Michael S. Striker

[57] ABSTRACT

An annular member of elastomeric material has a central passage and includes a main portion and a pair of tubular portions each of which is to fittingly receive a pipe end. An axially slotted sleeve of metallic material is accommodated in and vulcanized to each end portion, being provided with inwardly directed mutually opposite teeth adapted to bite into the pipe end. A sealing lip extends radially and axially inwardly at the region of the juncture between the main portion and the respective end portion. A reinforcement ring is embedded in this member in the same region adjacent the sealing lip, and a clamp surrounds each end portion for sealingly pressing the same against a pipe end accommodated therein.

11 Claims, 1 Drawing Figure

PATENTED JAN 21 1975
3,861,721
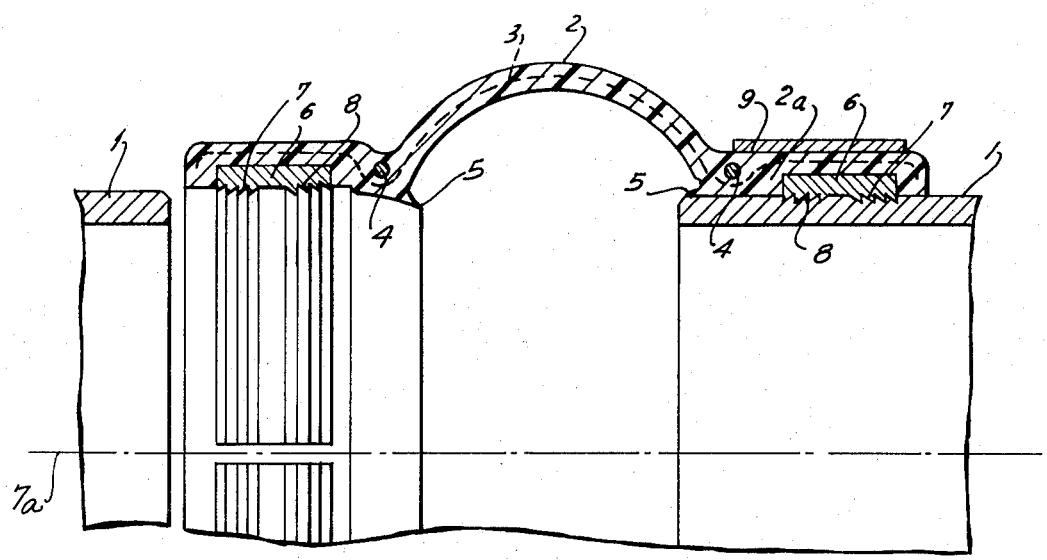

PIPE EXPANSION JOINT

BACKGROUND OF THE INVENTION

The present invention relates generally to pipe joints, and more particularly to pipe expansion joints.

Expansion joints of the type under discussion serve as an elastic coupler between two pipes or tubes, to accommodate expansion and contractions of the pipe as well as to absorb vibrations and sounds which are transmitted between stationarily mounted pipes or tubes. According to the prior art, they use an elastically formable member provided at opposite ends with flanges or screw threaded couplings, which permit a pressure-tight connection with the respective pipe ends. It is conventional to provide the elastic coupling at its ends with respective embedded metal rings around which any reinforcement inserts which are accommodated in the body of the coupler itself, can be placed. This results in the formation of outwardly extending bulges at the ends of the coupler, and behind these bulges the flange or screw threaded component used for connecting the coupler to the respective pipe end so engages that the bulge is located in a recess provided in the flange or screw threaded component. This prevents an unintentional or undesirable withdrawal of the coupler from the respective flange or screw threaded connecting components. The problem with these prior-art constructions is that they are rather cumbersome to install and to handle, as well as being expensive to produce. Furthermore, if only a limited space is available it is very difficult to install these known couplings.

Another type of coupling proposed in the prior art in order to overcome the drawbacks outlined above, utilizes an elastically deformable coupler having cylindrical end portions each of which is pushed onto the end of one of the tubes or pipes to be connected, with clamping arrangements engaging these end portions and clamping them against the respective pipe. The installation and manufacture of this type of coupler is simpler than those previously mentioned, however, this second type of coupler is not suitable for use with pipes which are under high internal pressure. The reason for this is self-evident and need not be belabored. It has been proposed to rectify this difficulty by forming the interior of the tubular end portions of the coupler with circumferential grooves, in which retaining rings are installed, with holes being provided in the pipe ends, through which pins are inserted which engage these retaining rings. The problem with this approach is that the end portions must be so elastic that they can be pulled over the retaining rings which, of course, are anchored on the pipe ends. If there is sufficient elasticity to do so, however, then the end portions will be capable of slipping through between the clamp and the holding ring after the clamp has been applied, so that the installation of the holding ring itself is of little use. Moreover, it is necessary to provide the pipe ends in situ with the bores which correspond to the bores of the holding rings, in order to insert the pins which anchor the holding rings. Moreover, it has been observed that these pins can easily be sheared off at the edges of the bores in the pipe end and the bores in the ring, so that this approach has not been found satisfactory.

SUMMARY OF THE INVENTION

It is, accordingly, an object of the present invention to overcome the disadvantages of the prior art.

More particularly, it is an object of the present invention to provide a coupler for joining of pipes which is not possessed of the aforementioned disadvantages.

An additional object of the invention is to provide such a coupler which is simple and inexpensive to produce, and which can be readily installed.

Another object of the invention is to provide such a coupler which can be used even in conditions where little space is available and which can be employed everywhere without having to subject the pipe ends to special processing or treatments, and without requiring the use of special tools for its installation or removal.

In keeping with these objects, and with others which will become apparent hereafter, one feature of the invention resides in a coupler for joining of pipes which, briefly stated, comprises an annular member of elastomeric material having a central passage and including a main portion and a tubular end portion which is to fittingly receive a pipe end. An axially slotted sleeve of metallic material is accommodated in and fast with this end portion. This sleeve has inwardly directed mutually oppositely inclined teeth adapted to bite into the pipe end. A sealing lip extends radially and axially inwardly at the region of a juncture between the main portion and the end portion. A reinforcement ring is embedded in this member in the region adjacent the sealing lip. Clamping means surround the main portion for sealingly pressing the same against a pipe end accommodated in said end portion.

Normally, of course, the coupler will have two of the end portions each provided with one of the slotted sleeves, sealing lip, reinforcement ring and clamping means. It is advantageous if the slotted sleeve in each instance is provided with annular teeth of saw tooth-shaped cross section, each of said teeth having flanks one of which is located in a substantially radial plane with reference to the longitudinal axis of the annular member, and with different ones of the teeth being mutually inclined in opposite axial directions, that is inwardly and outwardly of the main portion, respectively. It is also advantageous if one or more layers of reinforcing material, for instance fabric of textile or metallic filaments, are embedded in the annular member, preferably inwardly of the reinforcement ring or rings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic axial section through an embodiment of the invention.

DESCRIPTION OF THE PREFERRED EMBODIMENTS

Discussing the drawing in detail, it will be seen that the coupler illustrated is an annular member of elastomeric material, for instance natural or synthetic rubber. It has a main portion 2 which in this instance is provided at both of its opposite axial ends with cylindrical end portions 2a. The main portion is of outwardly bulging configuration and the entire coupling member has an axially extending central passage. A layer of reinforcing material 3 is embedded in the wall of the annular member and each of the end portions is provided at its juncture with the main portion 2 with an embedded reinforcing ring 4 which surrounds the layer 3 and prevents the same from being outwardly deflected.

The inner circumferential edge of each end portion 2, that is the edge adjacent the main portion 2, is provided in the region of the respective reinforcing ring 4 with an axially inwardly annular sealing lip 5 which may be of the same material as the annular member. A slotted sleeve 6 is accommodated within each of the end portions 2a and secured by vulcanization to the inner circumferential surface thereof. The slot is a single axially extending slot 7a which is provided so that, when an external force is applied to the respective end portion 2a, the sleeve 6 can be reduced in cross section by squeezing it so that the slot 7a is closed. The force would, of course, be acting essentially radially inwardly. Depending upon the extent of the force, the slot 7a will close completely or partially. The inner circumferential surface of each of the sleeves 6 is provided with saw toothedshaped circumferentially extending ridges 7 inclined somewhat in axially outward direction, and with similar saw toothedshaped circumferentially extending ridges 8 which are inclined somewhat in axially inward direction. In other words, the teeth are so configured that each is bounded by two flanks one of which is located substantially in a radial plane. It is advantageous is the sleeve 6 which, in any case, are of metallic material, are made of hardened steel and are so embedded in the inner circumferential surfaces of the end portions 2a that only the teeth extend radially inwardly beyond these inner circumferential surfaces. Depending upon the particular requirements, the slot 7a can be filled partially or completely with the elastomeric material of the annular member, because this will still permit in most instances a sufficient clamping-shut of the respective slot. However, it is also possible to insert a filler into the respective slot 7a during the manufacture of the respective annular member and vulcanization of the sleeve 6 thereto and to subsequently remove this filler so that the slot 7a cannot be filled with material. In many instances, however, the filling of the slot with the elastomeric material of the annular member is actually advantageous because during compression and partial closing of the slot 7a this material will become deformed and will sealingly fill the slot.

When the coupler according to the present invention is to be installed on the pipe ends 1 of two pipes to be connected, each of the pipe ends 1 is inserted into one of the end portions 2a until its circumferential surface in the region of its respective end face is engaged by the sealing lip 5. This installation can be carried out even if there is rather little space available between two stationarily mounted pipes, by squeezing the main portion 2 in axial direction, and it requires no particular special tools. Subsequently, a clamping member 9 such as a hose clamp or the like of known construction which is only diagrammatically illustrated in the drawing, is placed around each of the end portions 2a and is tightened, thereby drawing the respective end portion 2a and the slot 6 therein against the circumferential surface of the pipe end 1 accommodated in it. Because the sleeve 6 is advantageously of hardened steel and therefore has a substantially greater hardness than the material of the respective pipe 1, the teeth 7 and 8 bite into the surface of the pipe end portion 1. If, as a result of heating or cooling of the pipes, the pipes expand or contract, or if the internal pressure attempts to stretch the coupling, any slipping of the sleeves 6 is prevented by the teeth 7. On the other hand, the teeth 8 prevent any slipping in a sense which could result in separation of the respective pipe ends from the coupler.

The sealing lips are pressed in tightly sealing relationship against the outer circumferential surfaces of the pipes 1 by the pressure existing in the coupler, and this sealing contact will be the better the higher the pressure is in the pipeline, including the coupler. Moreover, the teeth 7 and 8 have an additional sealing effect as soon as the deformable material of the annular member which is accommodated in the slot 7a has completely filled the slot 7a under the forces exerted by the hose clamp 9 and also sealingly contacts the circumferential surface of the respective pipe 1.

In almost all instances it is unnecessary to subject the pipe ends to special treatment or operations before the coupler according to the present invention can be installed. If for some reason a particularly deep biting of the teeth 7 and 8 into the pipe end portions is desired, then the latter may be provided with some outer circumferential grooves, which can be carried out very easily and in situ. The reinforcing rings 4 prevent outward deflection of the insert layer 3, and further assure an improved contact of the respective sealing lip 5 against the outer circumferential surface of the associated pipe 1 when there is no pressure in the system.

It will be appreciated that various modifications may be made from the exemplary illustrated embodiment without departing from the concept of the invention.

It will be understood that each of the elements described above, or two or more together, may also find a useful application in other types of constructions differing from the types described above.

While the invention has been illustrated and described as embodied in a coupler for joining of pipes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A coupler for joining of pipes, comprising an annular member of elastomeric material having a central passage and including a main portion and a tubular end portion which is to fittingly receive a pipe end; an axially slotted sleeve of metallic material accommodated in and fast with said end portion, said sleeve having inwardly directed mutually oppositely inclined teeth adapted to bite into the pipe end; a sealing lip extending radially and axially inwardly at the region of a juncture between said main portion and said end portion; a reinforcement ring embedded in said member in said region adjacent said sealing lip; and clamping means surrounding said end portion for sealingly pressing the same against a pipe end accommodated in said end portion.

2. A coupler as defined in claim 1, wherein said sleeve is of hardened steel.

3. A coupler as defined in claim 1, wherein said sleeve is vulcanized to said end portion.

4. A coupler as defined in claim 1, wherein said teeth are saw tooth-shaped circumferential ridges each having a flank, one of which is located substantially in a radial plane.

5. A coupler as defined in claim 4, wherein some of said teeth have one flank facing axially in direction outwardly away from said main portion, and other of said teeth have one flank facing axially in direction inwardly towards said main portion.

6. A coupler as defined in claim 1, and further comprising at least one layer of reinforcing material embedded in said member radially inwardly of and surrounded by said reinforcing ring.

7. A coupler as defined in claim 6, wherein said reinforcing material is a fabric of metallic threads.

8. A coupler as defined in claim 6, wherein said reinforcing material is a fabric of textile fibers.

9. A coupler as defined in claim 1, wherein said annular member comprises another tubular end portion transversely spaced from the first-mentioned tubular end portion and also adapted to fittingly receive a pipe end, and another axially slotted sleeve of metallic material accommodated in and fast with said other tubular end portion, said other sleeve having inwardly directed mutually oppositely inclined teeth adapted to bite into a pipe end.

10. A coupler as defined in claim 1, wherein said main portion is of radially outwardly bulging configuration.

11. A coupler as defined in claim 10, wherein said sealing lip extends radially and axially inwardly at the region of a juncture located transversely from the apex of said outwardly bulging main portion and said tubular end portion for sealingly abutting the outer surface of a pipe end.

* * * * *